United States Patent [19]

Goksel

[11] 4,239,530
[45] Dec. 16, 1980

[54] PROCESS FOR PRODUCING METALLIZED IRON PELLETS

[75] Inventor: Mehmet A. Goksel, Houghton, Mich.

[73] Assignee: Board of Control of Michigan Technological University, Houghton, Mich.

[21] Appl. No.: 2,257

[22] Filed: Jan. 10, 1979

[51] Int. Cl.³ .......................................... C21B 13/08
[52] U.S. Cl. ............................................. 75/34; 75/3
[58] Field of Search ................... 75/1, 3, 4, 5, 29, 33, 75/34, 35, 36, 37, 38, 39; 23/313 R

[56] References Cited

U.S. PATENT DOCUMENTS

| | | | |
|---|---|---|---|
| 2,793,109 | 5/1957 | Huebler et al. | 75/3 |
| 2,806,779 | 9/1957 | Case | 75/33 |
| 2,855,290 | 10/1958 | Freeman | 75/33 |
| 3,029,141 | 4/1962 | Sibakin et al. | 75/3 |
| 3,140,169 | 7/1964 | Smith et al. | 75/33 |
| 3,188,195 | 6/1965 | Price | 75/3 |
| 3,219,436 | 11/1965 | Heitmann et al. | 75/34 |
| 3,235,371 | 2/1966 | Volin et al. | 75/3 |
| 3,264,092 | 8/1966 | Ban | 75/5 |
| 3,313,617 | 4/1967 | Ban et al. | 75/5 |
| 3,333,551 | 8/1967 | Ban | 75/5 |
| 3,369,888 | 2/1968 | Cruse, Jr. | 75/34 |
| 3,377,156 | 4/1968 | Kalina et al. | 75/26 |
| 3,386,816 | 6/1968 | English | 75/33 |
| 3,682,621 | 8/1972 | Struve et al. | 75/34 |
| 3,770,416 | 11/1973 | Goksel | 75/25 |
| 3,894,865 | 7/1975 | Wienert | 75/36 |
| 3,938,987 | 2/1976 | Ban | 75/3 |

FOREIGN PATENT DOCUMENTS

844529 6/1970 Canada .

Primary Examiner—L. Dewayne Rutledge
Assistant Examiner—Michael L. Lewis
Attorney, Agent, or Firm—Michael, Best & Friedrich

[57] ABSTRACT

Highly metallized, non-pyrophoric pellets are produced from a finely-divided iron ore concentrate by preparing a moistened mixture of the ore concentrate, a finely-divided carbonaceous material in an amount at least sufficient to reduce all the iron oxide to metallic iron, about 1 to about 30 weight % of a bonding agent, such as burned or hydrated lime, and 0 to up to about 3 weight % of a siliceous material (as available $SiO_2$), such as silica, forming green pellets from this mixture, drying the green pellets to a moisture content of 5% or less, hydrothermally hardening the dried, green pellets by contacting them with steam under pressure, and metallizing the hardened pellets by tumbling them in a reduction furnace, such as a rotary kiln, at a reduction temperature of about 1033° C. up to the melting point of the metallized pellets and in the presence melting point of the metallized pellets and in the presence of a substantially non-oxidizing atmosphere for a sufficient time to reduce a substantial portion of the iron oxide therein to metallic iron. In a preferred embodiment, a charring coal is fed into the rotary kiln along with the hardened pellets and is charred during pellet metallization. The resulting char, after separation from the metallized pellets and comminution, is recycled for use as the carbonaceous material in the starting mixture.

24 Claims, 1 Drawing Figure

PROCESS FOR PRODUCING METALLIZED IRON PELLETS

BACKGROUND OF THE INVENTION

This invention relates to the direct reduction of pellets made from an iron oxide-containing material to produce hardened pellets which contain a substantial portion of a metallic iron and are particularly suitable as a charge to iron and steelmaking furnaces.

The demand for hardened, metallized iron pellets has increased significantly in the last decade along the with an increase in the use of electric furnaces for producing steel. Metallized iron pellets having a consistent chemical composition and a reasonably stable price are desired as replacement for scrap steel commonly used as part of the charge in electric steelmaking furnaces. Also, considerably lower capital investment is required to set up a facility for producing steel by the metallized pellets-electric furnace method as compared to the blast furnace-basic oxygen furnace method. This often is a major consideration for smaller companies and developing countries, particularly those countries which do not have a readily available supply of coking coal.

Heretofore, metallized iron pellets have been produced primarily by two different processes, solid-gas and solid-solid. In one type solid-gas process, exemplified by U.S. Pat. Nos. 2,793,109 (Huebler et al) and 3,369,888 (Cruse), iron ore pellets and/or lumps are introduced into a vertical reactor or shaft furnace and are contacted therein with a reducing gas, such as hydrogen and/or carbon monoxide, at an elevated temperature. The reducing gas is diffused into the pellets or lumps and reduces the iron oxides to metallic iron. The reducing gases for this type process usually are supplied by reforming natural or petroleum gases. Consequently, the future of these processes are highly dependent upon the availability of natural or petroleum gases. Also, the metallized pellets often are very porous and highly pyrophoric, requiring additional treatment to make them safe for handling and storage. Furthermore, the reduction reaction takes several hours with attendant operating costs and production rate limitations.

In another type solid-gas process, exemplified by U.S. Pat. No. 3,377,156 (Kalina et al), a bed of particulate iron ore is fluidized with a stream of carbon monoxide-containing gas heated to an elevated temperature ranging up to just below the sintering temperature of the ore. This type process has most of the above-mentioned shortcomings.

In one type of solid-solid process, exemplified by U.S. Pat. No. 2,855,290 (Freemann), 3,029,141 (Sibakin et a l) and 3,386,816 (English), roasted or indurated iron oxide pellets are introduced into the rotary kiln furnace and tumbled in the presence of coke or coal fines, and usually a fluxing agent such as limestone or dolomite, at an elevated temperature. Carbon monoxide, generated by partial combustion of coal or coke, diffuses through the pellets and reduces the iron oxide to metallic iron. An oxidizing gas is required in some cases to generate sufficient carbon monoxide. In this type process, reducability of the pellets depends, among other things, on the temperature of the kiln, porosity of the pellets, particle size of the iron oxide, and reactivity of the coal or coke. Accordingly, the operating temperatures must be closely controlled to a level below the melting temperature of iron oxide in order to keep the pores open and thereby insure diffusion of the reducing gas through the pellets. For some iron oxides, the pellet reduction can take up to as long as 16 hours, require furnaces up to about 410 feet (120 m) in length and consume up to 20 million or more BTU per ton of metallized pellets with no heat recovery.

In the process disclosed in U.S. Pat. No. 3,219,436 (Heitmann et al), moist, green iron oxide pellets dusted or coated with coal or coke fines are introduced directly into a rotary kiln furnace with additional coal or coke and dolomite. The resultant pellets, which are highly porous (low density), are crushed, briquetted and used as a portion of a smelter furnace charge.

In another type solid-solid process, exemplified by U.S. Pat. Nos. 2,806,779 (Case), 3,264,092 (Ban), 3,313,617 (Ban), 3,333,951 (Ban) and 3,938,987 (Ban), carbonaceous fines are mixed with iron oxide fines (in amounts up to that required to reduce 100% of the iron oxides to metallic iron), with or without a fluxing agent such as limestone, to increase the rate of reduction. Pellets formed from the resulting mixture do not have sufficient strength, without further treatment, to withstand the tumbling in a rotary kiln furnace and, therefore, must be reduced on a traveling or circular grate. Consequently, this type process has not been used on a commercial scale.

A particular note should be made of U.S. Pat. No. 3,938,987 (Ban) which teaches that, if a non-agglomerating type carbonaceous material is used in an amount sufficient to reduce all the iron oxide, it interferes with the internal matrix for holding the pellet together. This patent further teaches that this problem can be obviated by reducing the amount of carbonaceous material to 40–80% of that required to reduce the iron oxide to metallic iron. Consequently, the pellets are only partially reduced on a traveling grate. If such partial pellets were used as a charge to an electric steelmaking furnace, substantial amounts of electrical power would be required to complete the reduction.

Canadian Pat. No. 844,529 (Volin et al) discloses incorporating a solid reductant, such as anthracite coal, into mineral ore agglomerates to facilitate the rate of reduction. Green pellets are formed from a moistened mixture of iron ore, the solid reductant and a bonding agent and then hydrothermally hardened at temperatures below the combustion or decomposition of the solid reductant. This patent does not disclose any specific process for directly reducing such pellets.

U.S. Pat. No. 3,770,416 (Goksel) discloses forming green agglomerates from a moistened mixture of iron oxide, such as steel plant waste dust, a sufficient quantity of a carbonaceous material to reduce the iron oxide to metallic iron, and a bonding agent such as calcium oxide, hydrothermally hardening the agglomerates at a temperature below the combustion and decomposition of the carbonaceous material, and then heating the hardened agglomerates at an elevated temperature, such as in a shaft furnace, to reduce a substantial portion of the iron oxide to metallic iron. This patent did not disclose directly reducing such hardened agglomerates in an agitated or tumbling environment.

SUMMARY OF THE INVENTION

A principal object of the invention is to provide a simplified process for producing strong, highly metallized pellets from finely-divided, iron oxide containing materials.

Another object of the invention is to provide such a process which is capable of producing substantially completely metallized, non-pyrophoric and oxidation resistant pellets within a reduction time as short as 30 minutes or less.

A further object of the invention is to provide metallized iron pellets which are particularly suitable as a charge to an electric steelmaking furnace.

A still further object of the invention is to provide metallized iron pellets which are self-fluxing.

Other objects, aspects and advantages of the invention will become apparent to those skilled in the art upon reviewing the following detailed description, the drawing and the appended claims.

Briefly, the process of invention includes the steps of preparing a moistened mixture including a finely divided iron oxide-containing material, a finely-divided carbonaceous material in an amount at least sufficient to reduce all the iron oxide to metallic iron, about 1 to about 30 weight % of a bonding agent selected from a group consisting of oxides, hydroxides and carbonates of calcium and magnesium and mixtures thereof, and 0 to about 3 weight % of a siliceous material (as available $SiO_2$), forming the resulting mixture into discrete, agglomerates or pellets, hydrothermally hardening of the pellets by contacting them with steam for a time period sufficient to form them into hardened, integral bonded masses, and heating the hardened pellets while tumbling in a reduction furnace at a temperature of about 1900° F. (1033° C.) up to the melting point of the metallized pellets and under a substantially non-oxidizing atmosphere for a time period sufficient to reduce a substantial portion of the iron oxide therein to metallic iron. The metallized pellets are highly densified, non-pyrophoric and highly resistant to oxidation. They can be made self-fluxing and capable of assisting in the removal of sulfur from a hot melt when melted in a steelmaking process by using lime as the bonding agent and adjusting the amount of lime and/or carbonaceous material included in the starting mixture.

In one embodiment, the hydrothermally hardened pellets are tumbled in a heated rotary kiln furnace and in the presence of a substantially non-oxidizing atmosphere, with or without external carbonaceous material. The presence of internal carbon in the pellets permits the kiln to be operated at conditions whereby the pellets can be substantially completely metallized within time periods as short as 30 minutes or less and 5–15 minutes at higher temperatures within the above range.

In another embodiment a charring coal is introduced into the rotary kiln along with the hydrothermally hardened pellets and the rotary kiln is operated under conditions whereby the coal is not combusted and, therefore, does not participate in the reduction reaction. Instead, the volatile components of the coal are driven off and burned to assist in heating the kiln and generate a char which, after cooling, is separated from the pellets and comminuted for use as the carbonaceous material in the starting mixture.

DESCRIPTION OF THE PREFERRED EMBODIMENTS

The process can be used to produce metallized pellets from iron ore concentrates and so-called "steel plant waste dust" or iron-rich (e.g. 30–80% iron) solid particulates or fines recovered as by-products from steelmaking processes, including dust collected from the fumes of BOF, open hearth, blast and electric furnaces, mill scale fines, grit chamber dust, fines separated from pelletized iron ore, etc. As used herein, the term "iron oxide-containing material" means either iron ore concentrates, steel plant waste dust or mixtures thereof. The process is particularly suitable for producing highly metallized pellets from iron ores, such as hematite and magnetite, preferably in the form of high purity ores or concentrates containing about 45–70% iron and the balance gangue. Accordingly, the process, for the most part, will be described with an iron ore concentrate being used as the starting material.

A starting mixture is first prepared by thoroughly blending together an iron ore concentrate, a carbonaceous material, a bonding agent, a siliceous material and a sufficient amount of water to form a moistened mixture capable of being formed into discrete agglomerated masses or pellets.

As mentioned above, suitable bonding agents include the oxides, hydroxides and carbonates of calcium and magnesium and mixtures thereof. Burned lime, CaO, and hydrated lime, $Ca(OH)_2$, are preferred because, in addition to functioning as a bonding agent, they can assist in slag formation and sulfur removal when the metallized pellets are melted in a steelmaking furnace as discussed below. The amount of bonding agent used is about 1 to about 30 weight % based on the total weight of the dry solids. When less than about 1 weight % is used, the hardened pellets do not have sufficient crush resistance or compressive strength to withstand the tumbling environment of a rotary kiln. On the other hand, amounts of the bonding agent in excess of about 30 weight % do not appreciably increase the compressive strengths and can dilute the concentration of metallized iron in the final pellets to an undesirable level.

When the bonding agent is to serve primarily for bonding, the amount used preferably is about 2 to about 10 weight %. When burned or hydrated lime is used as the bonding agent and it is desired to make the metallized pellets self-fluxing for use in an electric steelmaking furnace, the weight ratio of the lime, calculated as CaO, to the total weight of the siliceous material in the mixture (including the naturally occurring siliceous material in the iron ore concentrate and that added to the mixture), calculated as $SiO_2$, should be about 0.5:1 to about 5:1. If the metallized pellets are to be transported relatively long distances, the self-fluxing capability may represent a trade-off from a cost standpoint. That is, the added cost for transporting metallized pellets containing higher concentrations of lime may outweigh the economic advantage of the pellets being self-fluxing. As explained below, a slight excess of burned or hydrated lime can be added to the mixture so that the resultant pellets assist in transporting sulfur from the hot melt into the slag when the pellets are melted in an electric furnace.

If the iron oxide-containing material contains an appreciable amount (e.g., 0.5 weight %) of available $SiO_2$ capable of reacting with the bonding agent to form silicate or hydrosilicate bonds therewith under the conditions of hydrothermal hardening, hardened pellets having sufficient strengths to withstand tumbling during the reduction step can be obtained without adding a siliceous material to the starting mixture. Excessive amounts of silica should be avoided in order to minimize the amount of slag formed by the resultant metallized pellets in a hot melt. For high purity iron ore concentrates containing relatively small amounts of $SiO_2$, an amount of natural or artificial siliceous material containing up to 3 weight % available $SiO_2$, based on the total weight of the dry solids, is added to the starting mixture. Representative examples of suitable siliceous material include finely ground quartz, silica sand, bentonite, diatomaceous earth, fuller's earth, sodium, calcium magnesium and aluminum silicates, pyrogenic silica, various hydrated silicas and mixtures thereof. Of these, finely ground quartz and silica sand are preferred.

Suitable solid carbonaceous material include both agglomerating and non-agglomerating coals, such as coking and non-coking bituminous coals, anthracite coals and lignite, and various forms of pyrolyzed carbon, such as coke breeze, bituminous and anthracite coal char, lignite char, wood char, graphite and the like. Less volatile coals and chars are preferred because they generally provide higher compressive strengths.

The primary function of the carbonaceous material is to supply internal carbon for reducing the iron oxide to metallic iron during the reduction. Accordingly, the minimum amount used corresponds to that needed to supply an amount of available carbon (fixed carbon content) at least sufficient to reduce all iron oxide to metallic iron, thereby eliminating the need for external reducing agent during the reducing step. The amount of carbonaceous material preferably is a small excess of the calculated stoichiometric amount, for example, up to about 20 weight % based on the total weight of the dry solids, in order to maximize the degree of metallization and to provide some excess carbon which, at the melting temperatures of steel, may combine with excess CaO in the metallized pellets to remove sulfur. While not completely understood at this time, it appears that excess CaO and carbon in the metallized pellets react with a substantial portion of the sulfur (in the form of FeS) and transport the sulfur from the hot metal into slag as CaS.

The amount of water included in the starting mixture varies depending upon a particular agglomeration technique employed. The agglomerates preferably are rounded or generally spherical to facilitate their tumbling during the reducing step. Accordingly, pelletizing processes employing a balling drum or disc which forms spherical pellets usually are more desirable. For such processes, the total amount of water in the moistened starting mixture generally should be about 10 to about 20 weight %, preferably about 12 to about 15 weight %.

The average particle size of all the solid materials in the starting mixture, including the iron oxide-containing material, the carbonaceous material, the bonding agent and the siliceous material, should be about $-200$ to about $-400$ mesh, preferably $-325$ mesh. Particle sizes coarser than about 200 mesh increases difficulty of producing pellets and, in some cases, provides insufficient surface area to obtain the requisite high strength bond in the resultant hardened pellets.

Most carbonaceous materials, particularly the pyrolyzed types, have many small capillary-like pores or cavities which tend to absorb water during the mixing step. This free internal moisture tends to be converted to steam during the hydrothermal hardening step, causing a reduction in the compressive strength and sometimes cracking or bursting when excessive amounts are present in the pores or cavities. This problem can be minimized by allowing the moistened mixture to rest or stand a sufficient time for a substantial portion of the free internal moisture in the carbonaceous material to migrate from the pores or cavities to the surface particles.

Time and conditions for this step can vary considerably depending primarily upon the particular type of carbonaceous material and bonding agent being used. For instance, coke breeze and chars generally are more porous than bituminous or anthracite coal fines and, consequently, absorb more moisture and require a longer standing time. Removal of excess internal moisture from the pores or cavities in the carbonaceous material can be accelerated by heating the moistened mixture to an elevated temperature.

When burned lime and/or magnesium oxide is used as the bonding agent, they react with the moisture present to form hydrates. This exothermal hydration reaction tends to accelerate migration of the free internal moisture to the particle surface, resulting in a shortening of the standing time required without external heating.

As a general guide, the moistened mixture, prior to agglomeration, is allowed to stand for about 1 to about 48 hours, preferably about 2 to about 3 hours, at a temperature of about 60° to about 90° C. When burned lime or magnesium oxide is used as the bonding agent, the moistened mixture preferably is placed in a closed, thermally insulated container to take advantage of the exothermal hydration reaction.

The moistened mixture is formed into green pellets having a rounded or spherical shape as mentioned above. The green pellets should have a diameter of about 5 to about 50 mm, preferably about 8 to about 15 mm. Metallized pellets produced from pellets having a diameter much smaller than about 5 mm are difficult to handle, while pellets having a diameter larger than about 50 mm exhibit slow internal heating during the reducing step and require unreasonably long heating times to obtain a high degree of metallization.

In order to obtain hardened pellets having an acceptable crush resistance or compressive strength to withstand agitation or tumbling during the reducing step, the green agglomerates are dried to a free moisture content of about 5 weight % or less, preferably about 3 weight % or less, prior to the hydrothermal hardening step. This drying can be accomplished by conventional means, such as by placing the green pellets in an oven or by blowing the hot gas thereover, using drying temperatures up to the decomposition temperature of the carbonaceous material. The time required to reduce the free moisture content of the green pellets to about 5 weight % or less depends upon the drying temperatures used, the moisture content of the green pellets, the level to which the moisture content is reduced, the size and shape of the green pellets, etc.

After the green pellets have been partially or completely dried, they are introduced into a reaction chamber or pressure vessel, such as an autoclave, wherein they are heated to an elevated temperature in the presence of moisture to effect a hardening and bonding of the individual particles into an integral, high strength mass. The compressive strength of the hardened pellets produced by this hydrothermal hardening step depends to some extent upon the temperature, time amount of additives (including carbonaceous and bonding agent) and moisture content of the atmosphere used.

The application of heat to the green pellets can be achieved by any one of the number of methods. Use of steam is preferred because it simultaneously provides a source of heat and moisture necessary for the hydrothermal reaction. Either saturated steam or substantially saturated steam can be used. Superheated steam tends to produce hardened pellets having reduced strengths. Therefore, steam at temperatures and pressures close to that of saturated steam is preferred. Temperatures generally ranging from about 100° to about 250° C., preferably about 200° to about 225° C., can be satisfactorily employed to achieve the desired hardening of the green pellets within a reasonable time period.

Autoclaving pressures substantially above atmospheric pressure are preferred in order to decrease the hardening time and to improve the strength of the resulting hardened pellets. Generally, economic conditions dictate that the maximum pressure should not exceed about 35 atmospheres and a pressure of about 5 to about 25 atmospheres is preferred.

The retention time of the pellets in the reaction chamber or pressure depends upon several process variables, such as pressure, temperature and atmosphere of the chamber, size and composition of the pellets, etc. In any case, this time should be sufficient to obtain hardening and bonding of the individual particles into a hardened, high strength condition. When higher temperatures and conditions are used, the time for the hydrothermal hardening step generally is about 5 minutes to about 8 hours, preferably about 30 to about 60 minutes.

Since the hydrothermal hardening step takes place at a temperature below the decomposition temperature of the carbonaceous material and in a neutral steam atmosphere, there is no oxidation of the carbonaceous material and the fixed carbon contact therein remains available for the subsequent reduction step. Also, there is no oxidation of magnetite to hematite which is a problem in some pellet-hardening processes.

The hardened pellets preferably are transferred, while still hot, from the reaction chamber (autoclave) to a reduction furnace for metallization. Any suitable reduction furnaces capable of heating the pellets to a temperature of about 1900° F. (1033° C.) up to the melting point of the metallized pellets, (e.g., 2600° F. (1427° C.) or higher), while tumbling in the presence of a substantially non-oxidizing atmosphere, can be used. A conventional, refractory-lined, rotary kiln furnace is preferred because of its simplicity, ease of controlling the pellet residence time, capability of uniformly heating the pellets and other reasons discussed in more detail below. The hot, hardened pellets may contain relatively small amounts of free moisture (e.g. less than 1%) and have sufficient compressive strength to withstand tumbling in a rotary kiln furnace with little or no breakage.

For operations where the pellets are produced at one site and transferred to another for reduction, the compressive strength of the hardened pellets can be increased by rapidly drying them, immediately after removal from the reaction chamber and before appreciable cooling has occurred, to remove substantially all the free moisture therefrom. This drying can be accomplished in any convenient manner, such as placing the hot, hardened pellets in an oven or by blowing a hot gas thereover. Generally, a temperature of about 100° to about 350° C., preferably about 150° to 250° C., can be used for this post-hardening drying step.

Since the hardened pellets contain an amount of internal carbon sufficient to reduce all the iron oxide therein to metallic iron, the primary function of the rotary kiln furnace is to heat the pellets to an elevated temperature required for the reaction. This heating can be accomplished with one or more gas-, oil- or coal-fire burners and the introduction of a controlled amount of air sufficient to support combustion of the fuel. The hardened pellets are introduced into the rotary kiln furnace, which is preferably inclined in the usual manner and slowly rotated, for example, about 1–2 revolutions per minute. As the kiln is rotated and a bed of the pellets is tumbled and moves from the inlet to the discharge end of the kiln, hot combustion gases from the burner(s) pass thereover, preferably in a countercurrent direction.

As the outer region of the pellets is heated above about 900° C., the oxygen content of the iron oxide reacts with the internal carbonaceous material at the points of contact and produces carbon monoxide within the pellets. A resultant gas pressure build-up within the pellets causes the carbon monoxide to diffuse or permeate into the pellets and reacts with the oxygen content of the iron oxide to form carbon dioxide. At the same time, part of the carbon dioxide, upon contacting hot carbonaceous particles in the high temperature regions, reacts therewith to form additional carbon monoxide which further aids in the reduction process. These reactions can be expressed as follows:

$$Fe_3O_4 + 4C \rightarrow 3Fe + 4CO \quad (1)$$

$$Fe_3O_4 + 4CO \rightarrow 3Fe + 4CO_2 \quad (2)$$

$$CO_2 + C \rightarrow 2CO \quad (3)$$

Thus, each of the uniformly distributed particles of carbonaceous material in effect acts as a reduction center, resulting in a very rapid overall reduction rate of the iron oxide to metallic iron.

There are primarily two zones in the rotary kiln furnace, a heating zone at the inlet end wherein the pellets are introduced and heated to the reaction temperature and a hot or reduction zone (usually in the last ⅛ of the kiln furnace) wherein reactions (1), (2) and (3) proceed to provide the desired degree of metallization. In order to obtain substantially complete reduction times, the temperatures of the reaction zone should be at least about 1900° F. (1033° C.). At lower temperatures, the pellets tend to swell and weaker and reduction times are unreasonably long. In conventional direct reduction processes which rely upon external reducing gases, it is essential that the pores in the pellets be kept open so that external reducing gases can diffuse or permeate into the pellets and contact the iron oxide. Consequently, the maximum reduction temperature must be kept below the melting point of iron oxide, which is usually below about 2200° F. (1204° C.). In the present process, reduction temperatures up to as high as the melting point of the metallized pellets can be used without the normal loss of porosity because the internal carbon and generation of carbon monoxide gas within the pellets as discussed above. With reduction temperatures of about 2400° to 2600° F. (1316°–1427° C.), substantially complete metallization (e.g., up to about 97% or higher) can be obtained with reduction times (residence time in the hot or reduction zone) of 5 to 15 minutes. Even at lower reduction temperatures of about 1900° to 2400° F. (1033° to 1316° C.), metallization of about 90% or higher can be obtained within 30 minutes as compared to a minimum reduction time of at least 2 hours required by most conventional direct reduction processes to obtain the same degree of metallization. A reduction temperature of about 2300° to 2500° F. (1260° to 1371° C.) is presently preferred because substantially complete metallization can be conveniently obtained, without sticking or ring formation, with reduction times less than 15 minutes.

The reduction reaction should be carried out in a substantially non-oxidizing atmosphere in order to prevent reoxidation of the pellet surfaces and formation of an oxygen-rich shell which is undesirable in a steelmaking furnace and tends to cause sticking together of the pellets at temperatures of about 2400°–2600° F. (1316° to 1427° C.). If the amount of air admitted in the kiln is limited to that necessary to support combustion, the amount of carbon monoxide generated by the internal carbon in the pellets usually is sufficient to maintain a slightly reducing atmosphere which further minimizes oxidation. The presence of a slightly reducing atmosphere can be enhanced by introducing a carbonaceous material, such as bituminous coal, anthracite coal, coke fines or lignite, into the kiln, along with the pellets and operating the kiln so that the carbonaceous material does not combust. This external carbonaceous material does not participate in the reduction reaction and can be recycled through the kiln several times if desired.

In a preferred embodiment, a charring coal is used as the external carbonaceous material. The volatile components thereof are driven off and burned to assist in heating the kiln and the resulting char, after separation from the metallized pellets and comminution to the desired size, is recycled for use as the carbonaceous material in the starting mixture. Some coals may create sticking problems and/or form a ring inside the kiln when higher reduction temperatures are used because of a low melting ash. Such coals, prior to being added to the starting mixture or fed into the kiln, can be charred in a separate unit in a conventional manner and the gases generated during charring used as a fuel for the kiln.

Since the external carbonaceous material does not participate in the reduction reaction, the amount used is not critical. When a charring coal is used to generate char for use in the starting mixture while utilizing the volatiles to assist in heating, an amount at least sufficient to produce the required amount of coal char preferably is added to the kiln.

The hot, metallized pellets, together with the external carbonaceous material when used, are discharged from the kiln into a suitable cooler, such as a water quenched tank or a rotary cooler, and cooled therein in a non-oxidizing atmosphere (inert or reducing) to prevent the surfaces of the pellets from oxidizing. If external carbonaceous material is used as part of the kiln feed, the metallized pellets are separated therefrom with a suitable screening or magnetic separating apparatus and the separated carbonaceous material can be recycled to the process as described above.

Apparently, because of the tumbling action during reduction, the metallized pellets are highly densified, have a very low porosity and, therefore, are non-pyrophoric and are highly resistant to surface oxidation. The pellets also have a high degree of metallization, up to about 98% or higher, and high compressive strengths, up to about 190 pounds or higher, making them particularly suitable for use in electric furnace operations. Furthermore, they can be conveniently made self-fluxing and capable of removing sulfur from a hot melt by including an excess of lime and/or carbonaceous material in the starting mixture. The primary advantage of the process, in comparison with conventional direct reduction processes, is a substantially higher reduction reaction rate which permits higher production rates and lower operating costs.

Figure 1:
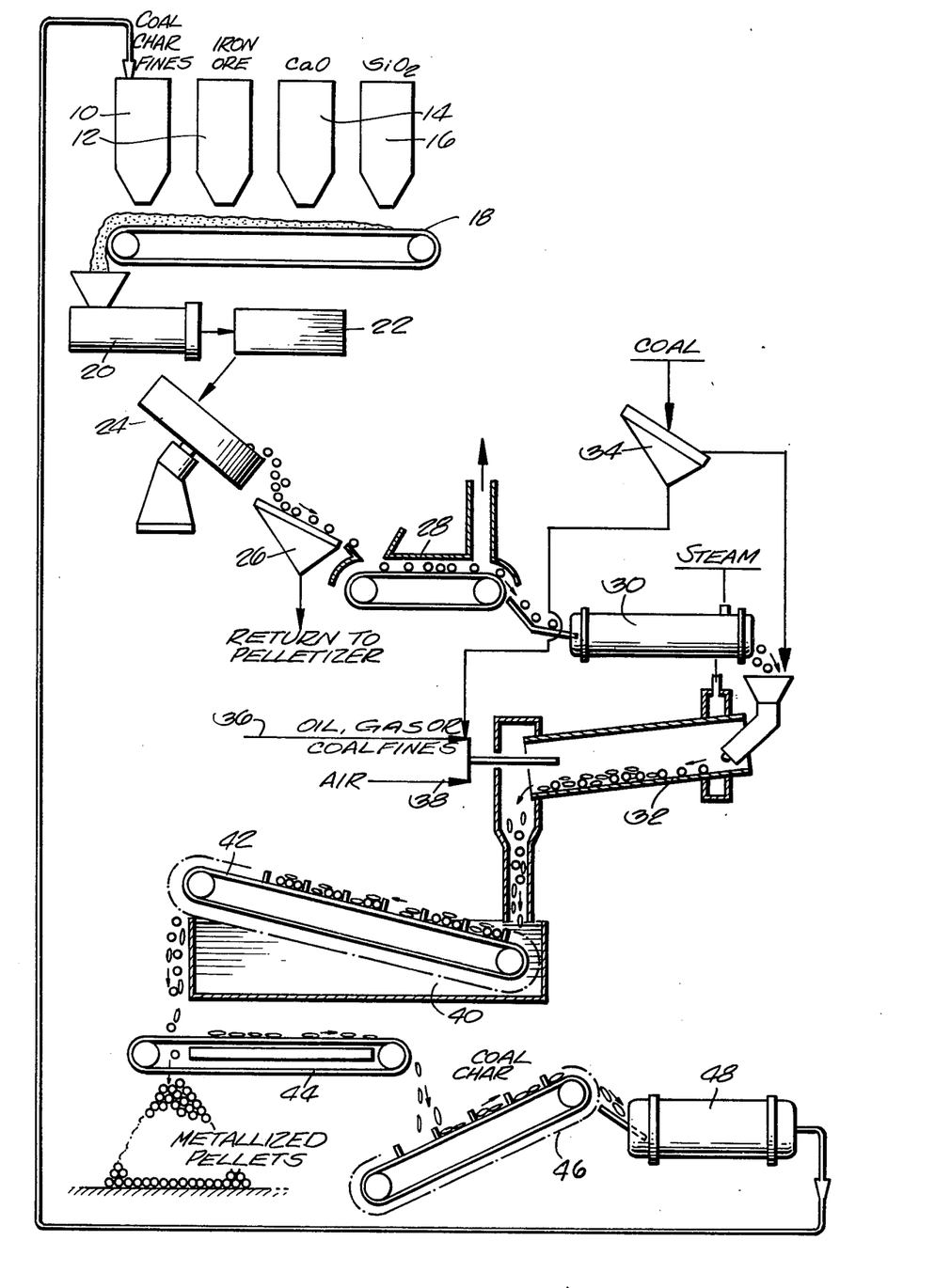
The single drawing is a schematic and diagrammatic flow diagram illustrating a preferred embodiment of the process.

The drawing schematically and diagrammatically illustrates a preferred embodiment of the process. Finely-divided coal char, iron ore concentrate, burned lime and silica are stored in respective supply hoppers, 10, 12, 14 and 16. Controlled amounts of each of these materials are discharged from the hoppers onto a conveyor 18 which transports them to a suitable mixture 20 wherein they are blended with an appropriate amount of water to obtain a moistened mixture suitable for pelletizing in a conventional balling device.

The moistened mixture is transferred from the mixer 20 to a closed container 22 wherein it is heated to a temperature of about 60°–90° C. for about 2-3 hours to remove excessive free internal moisture from the pores or cavities of the coal char fines. The moistened mixture is transferred from the container 22 to a conventional balling disc 24 for formation into green, spherically-shaped pellets. The green pellets containing 10–20% moisture are transferred from the balling disc 24 to a screen 26 which discharges all the green pellets larger than a predetermined size (e.g., 15 mm) into a suitable dryer 28 wherein a heated gas is blown over the pellets to reduce their moisture content to 5% or less. Green pellets smaller than the predetermined size separated by the screen 26 can be recycled to the balling disc 24 for use as seed material or transferred to a storage bin (not shown).

The dried, green pellets are transferred from the dryer 28 to a high pressure autoclave 30 wherein they are hydrothermally hardened in the presence of steam at a pressure of about 300 psig (20 atm) for about 1 hour. The hardened pellets are discharged from the autoclave 30 into the inlet or upper end of an inclined, refractory-lined, rotary kiln 32. At the same time, finely-divided charring bituminous coal larger than a predetermined size is discharged from a screen 34 into the upper end of the kiln 32 along with the pellets. The conventional metering device (not shown) can be used to control the amount of coal fines introduced into the kiln and provide the desired proportion of coal to pellets. As discussed above, these coal fines do not participate in the reduction reaction and are added primarily to generate char for use in the starting mixture and provide additional fuel without combusting.

The mixture of green pellets and coal fines is tumbled in the rotary kiln under the conditions discussed above until substantially all the iron in the pellets is reduced to metallic iron. The kiln 32 is heated to the desired temperature by a gas-, oil- or coal-fired burner (designated by reference numeral 36) which is located at the discharge or lower end of the kiln 32 and is supplied with combustion air by a fan (designated by reference numeral 38). As the pellets are tumbled through the kiln, new surfaces are continually exposed to the hot gases, thereby providing uniform heating of the pellets. When a coal-fired burner is used, the undersized coal fines from the screen 34 can be used as part of the fuel for the burner as illustrated.

The mixture of metallized pellets and coal char is discharged from the lower end of the kiln 32 into a water quench tank 40 wherein it is cooled while being shielded from the air to prevent oxidation of the pellet surfaces. The cooled mixture is transferred by a conveyer 42 from the quench tank 40 to a magnetic separator 44 which separates the magnetic metallized pellets from the coal char.

The coal char is transferred by a conveyer 46 to a conventional grinding mill 48 wherein it is comminuted to the desired size for use in the starting mixture. The comminuted coal char is recycled to the supply hopper 10 for subsequent addition to the starting mixture.

Without further elaboration, it is believed that one skilled in the art, using the preceding description can utilize the invention to its fullest extent. The following examples are presented to illustrate preferred specific embodiments of the invnetion and should not be construed as limitations thereto.

EXAMPLE 1

A magnetite ore concentrate having the chemical composition and size distribution set forth in Table I was used to prepare green pellets.

Three batches of pellets were prepared by mixing this ore concentrate together with water, burned lime, silica and a $-325$ mesh bituminous coal char in a pan mixer for a sufficient time to obtain a uniformly moist blend. The chemical composition of the bituminous coal char is set forth in Table II.

TABLE I
CHEMICAL AND PHYSICAL PROPERTIES OF MAGNETITE ORE CONCENTRATE

| Composition | | Size Analysis | |
|---|---|---|---|
| Constituent | Weight % | Mesh Size | % |
| Total Fe | 69.3 | +65 | 0.02 |
| Fe++ | 22.6 | +100 | 0.09 |
| CaO | 0.28 | +150 | 0.32 |
| MgO | 0.20 | +200 | 2.02 |
| $SiO_2$ | 2.76 | +270 | 7.96 |
| $Al_2O_3$ | 0.315 | +325 | 11.26 |
| P | 0.108 | −325 | 78.36 |
| S | 0.045 | | |
| Mn | 0.027 | | |

TABLE II
CHEMICAL COMPOSITION OF BITUMINOUS COAL CHAR

| Constituent | Weight % |
|---|---|
| Fixed C | 83.30 |
| Volatiles | 5.78 |
| S | 0.64 |
| P | — |
| Ash | 8.68 |
| CaO | 0.15 |
| MgO | 0.07 |
| $Al_2O_3$ | 2.14 |
| $SiO_2$ | 3.34 |

Green, spherically-shaped pellets (15 mm dia.) were prepared from each batch in a conventional balling device. The green pellets were dried to a moisture content of about 1% and then hydrothermally hardened in a high pressure steam autoclave at 300 psig (20 atm) for one hour. After cooling, the hardened pellets were dried in an oven to remove substantially all the free moisture.

Randomly selected hardened pellets from each batch were tested for compressive strength with a Dillon tester. The average compressive strengths for the three batches were 133 lbs (60 kp), 112 lbs (51 kp) and 108 lbs (49 kp), respectively. Other pellets were tested for impact strength by individually dropping them onto a ½ inch thick (1.25 cm) steel plate from a height of 18 in. (46 cm) for more than 25 times; none failed. These results indicate that hardened, carbon-bearing pellets prepared in accordance with the invention are sufficiently strong to withstand handling and the tumbling environment of a rotary kiln furnace.

The composition and chemical analysis of the hardened carbon-bearing pellets are set forth in Table III.

TABLE III
COMPOSITION AND CHEMICAL ANALYSIS OF HARDENED PELLETS

| | Weight % | | |
|---|---|---|---|
| Composition | Batch 1 | Batch 2 | Batch 3 |
| Constituent | | | |
| Magnetite | 82.50 | 81.50 | 80.50 |
| Bituminous coal char | 15.00 | 16.00 | 15.00 |
| CaO | 2.00 | 2.00 | 4.00 |
| $SiO_2$ | 0.50 | 0.50 | 0.50 |
| | 100.00 | 100.00 | 100.00 |
| Chemical Analysis | | | |
| Total Fe | 56.70 | 56.10 | 54.70 |
| Fe++ | 18.10 | 18.10 | — |
| CaO | 2.42 | 2.30 | 3.87 |
| MgO | 0.18 | 0.18 | 0.20 |
| $SiO_2$ | 2.64 | 2.67 | 2.87 |
| $Al_2O_3$ | 0.55 | 0.48 | 0.48 |
| P | 0.071 | 0.086 | 0.074 |
| S | 0.123 | 0.152 | 0.140 |
| C | 12.50 | 13.90 | 13.00 |
| Basicity Ratio: | | | |
| $\frac{CaO + MgO}{SiO_2 + Al_2O_3}$ | 0.82 | 0.79 | 1.21 |

From the chemical analysis, it can be seen that the pellets were of a self-fluxing nature. Their basicity ratio can be adjusted, if required to meet the requirements of a particular electric steelmaking furnace, by simply adding more or less lime.

EXAMPLE 2

The hardened pellets prepared in Example 1 were reduced in a Leco tube furnace. In each test, six pellets were placed in a ceramic boat and heated in the hot zone of the furnace under a 0.5 l/min. nitrogen flow. The pellets were heated at 1800° F. (982° C.), 2000° F. (1098° C.), 2200° F. (1204° C.), 2400° F. (1316° C.) and 2600° F. (1427° C.) for 5, 15, 30 and 60 minutes. In each test, the boat was slowly pushed from the entrance of the tube to the hot zone in approximately 3 to 4 minutes and, after metallization, was pulled out of the furnace at approximately the same rate. The temperature of the pellets at that time was approximately 800°–1000° F. (427°–538° C.). The final cooling of the pellets was accomplished in a ceramic tube under a nitrogen atmosphere at ambient temperature.

It was observed that, with reduction temperatures above 2000° F. (1093° C.), the pellets shrunk (with more shrinkage at the higher temperatures), were hard and very dense and exhibited no surface cracks or chipping. The metallized pellets were analyzed to determine the degree of metallization and the results are set forth in Table IV.

TABLE IV
DEGREE OF METALLIZATION AT DIFFERENT REDUCTION TEMPERATURES AND TIMES

| Reduction Temp., °F. | Reduction Time, min. | % Metallization |
|---|---|---|
| 1800 (982° C.) | 5 | 1.16 |
| | 15 | 3.46 |
| | 30 | 27.21 |
| | 60 | 43.70 |
| 2000 (1098° C.) | 5 | 15.84 |
| | 15 | 66.40 |
| | 30 | 89.26 |
| | 60 | 98.63 |
| 2200 (1204° C.) | 5 | 56.53 |
| | 15 | 97.96 |
| | 30 | 98.89 |
| | 60 | 99.97 |
| 2400 (1316° C.) | 5 | 92.47 |
| | 15 | 97.82 |
| | 30 | 98.38 |
| | 60 | 98.06 |
| 2600 (1427° C.) | 5 | 96.99 |
| | 15 | 97.85 |
| | 30 | 98.18 |
| | 60 | 98.07 |

From these test results, it can be seen that the rate of metallization is dependent upon the reductiomn temperature and a reduction time of only 5 to 15 minutes is required at a reduction temperature of 2600° F. (1427° C.) to substantially completely metallize the pellets.

EXAMPLE 3

The hardened pellets prepared in Example 2 were reduced in a laboratory-size rotary furnace using a cylindrical retort constructed from a oxidation-resistant steel, 11.5 cm long and having an internal diameter of 8 cm. The retort was rotated at 4 rpm in the furnace which heated it to 2100° F. (1150° C.).

Before each test, the furnace was first heated without the retort. Approximately 200 gm of pellets from each batch and 50 gm of −3+4 mesh size bituminous coal fines were placed in the retort and the retort was then placed in the furnace and rotated. During the entire test, the retort was flushed with a 0.5 l/min nitrogen flow to prevent oxidation of the pellets. Approximately 40–45 minutes was required for the retort to be heated to 2100° F. (1150° C.). Different samples of the pellets were held at that temperature for 0.5, 1, 2, 3, 4, 5 and 6 hours after which the furnace was turned off, the cover opened, and the retort cooled to approximately 900°–1000° F. (483°–538° C.) while being rotated. The retort was removed from the furnace and cooled to ambient temperature while being rotated in a nitrogen atmosphere. Pellets were separated from the char with a magnet, visually inspected and measured and weighed to determine their shrinkage. There was no evidence of chips or cracking and the pellets shrink slightly. 15 randomly selected pellets from each batch were tested for compressive strengths. The average compressive strengths were 134 lbs. (61 kp), 157 lbs (71 kp), 174 lbs (79 kp) and 243 lbs (110 kp) for reduction times of 0.5, 1, 3 and 6 hours, respectively. Pellets from each batch (all reduced 1 hour at 1150° C.) were chemically analyzed and the results are set forth in Table V.

TABLE V
CHEMICAL ANALYSIS OF METALLIZED PELLETS PREPARED BY PROCESS OF INVENTION - REDUCED FOR 1 HOUR AT 1150° C.

| | Weight % | | |
|---|---|---|---|
| Constituent | Batch 1 | Batch 2 | Batch 3 |
| Total Fe | 88.60 | 88.90 | 86.1 |
| $Fe^{++}$ | 0.97 | 0.00 | — |
| $Fe°$ | 87.80 | 87.70 | 84.5 |
| CaO | 4.18 | 3.51 | 6.02 |
| MgO | 0.30 | 0.28 | 0.31 |
| $SiO_2$ | 4.00 | 4.08 | 3.96 |
| $Al_2O_3$ | 0.87 | 0.78 | 0.78 |
| P | 0.056 | 0.074 | 0.09 |
| S | 0.223 | 0.264 | 0.190 |
| C | 0.70 | 1.68 | 0.51 |
| Mn | 0.06 | 0.06 | 0.04 |
| $Na_2O$ | 0.10 | 0.07 | 0.028 |
| $K_2O$ | 0.13 | 0.10 | 0.12 |
| Metallization % | 98.53 | 98.65 | 98.14 |
| Basicity Ratio | 0.89 | 0.78 | 1.34 |

The degree of pellet metallization of each reduction time was determined and is set forth in Table VI.

EXAMPLE 4

Two additional tests were run with the rotary furnace described in Example 3. In one test, the pellets from the three batches of Example 1 were reduced in the rotary furnace under the identical conditions of Example 3 without external carbon in the retort. The results were substantially the same as in Example 3, indicating that external carbon does not participate in the reduction reaction.

In another test, iron oxide pellets which did not contain internal carbon (similar to those used in prior art solid-solid processes) were reduced in the rotary furnace. These pellets were prepared with the same magnetite ore concentrate as Example 1. The magnetite ore concentrate was mixed with 0.75% bentonite and a sufficient amount of water for pelletizing in a balling device. The green, spherical-shaped pellets (having approximately the same diameter as those prepared in Example 1) were dried and fired at 2192° F. (1200° C.) under oxidizing conditions. The hardened pellets were reduced in the rotary furnace under the same conditions described in Example 3. The degree of pellet metallization was determined and the results are compared with the results from Example 3 in Table VI.

TABLE VI
COMPARISON OF PELLET METALLIZATION

| Reduction Time, hrs. | % Metallization | |
|---|---|---|
| | Invention | Prior Art |
| 0.5 | 100 | 11.39 |
| 1 | 100 | 17.96 |
| 2 | — | 31.42 |
| 3 | 100 | 36.73 |
| 6 | 100 | 54.68 |

From these results, it can be seen that iron oxides directly reduced in accordance with the invention were completely metallized within 30 minutes whereas pellets reduced by the simulated prior art process were only 11.39% metallized after 30 minutes and approximately 55% metallized after 6 hours under the same operating conditions. An extrapolation of the data from the latter test indicates that complete metallization could required up to 14–16 hours under these same conditions. A weight determination of the external coal after the reduction indicated that the amount consumed for the simulated prior art process was proportional to the degree of metallization but was near zero for the process of the invention.

EXAMPLE 5

Some commercially available metallized pellets have a tendency of self-ignition or oxidation and, therefore, may be dangerous during handling, storage or transportation unless treated with chemicals and/or briquetted.

Tests were performed to evaluate the self-ignition or oxidation tendency of metallized pellets prepared in accordance with the invention as compared to iron oxide pellets metallized by a solid-gas technique. The latter pellets, which did not contain internal carbon, were heated for 5 hours at a temperature of 900° C. in the presence of a gas mixture consisting of 50% carbon monoxide and 50% hydrogen. The degree of metallization was 97%.

A small tube furnace heated to 450° F. (230° C.) and flushed continuously with a 1 l/min flow of nitrogen was used for these tests. In each test, one pellet was placed in the furnace and a thermocouple was tightly fitted into a small hole drilled therein. When the thermocouple reading reached the furnace temperature, the nitrogen gas was replaced by oxygen gas at the same flow rate. After about 3–4 minutes, pellets reduced by the solid-gas technique ignited in a manner similar to a match and the thermocouple reading immediately increased to 1200° F. (649° C.). The same tests were repeated 5 times with pellets from the same batch. Similar tests were repeated on pellets which had been metallized in accordance with the invention at reduction temperatures of 2100° F. (1150° C.), 2300° F. (1260° C.), 2400° F. (1316° C.) and 2600° F. (1427° C.). None of the pellets ignited in any of these tests.

These results indicate that metallized pellets produced by the process of the invention are non-pyrophoric and resistant to self-oxidation. These desirable properties are believed to be attributable to their highly densified structure and low porosityl. When lime is used as the bonding agent, it is believed that a protective covering or shell of melted fluxing agents (calcium silicates) is formed over the metallized iron particles during the reduction step, thereby providing further resistance to oxidation.

EXAMPLE 6

Tests were performed with metallized pellets from batches 1 and 2 of Example 3 to evaluate their melting and sulfur-removal characteristics. A small plasma arc furnace including two horizontal graphite electrodes located above a magnesia crucible was used for these tests. Argon gas, at a flow rate of approximately 1 l/min, was introduced into the bottom of the furnace throughout the entire test. The metallized pellets, along with an amount of burned lime sufficient to raise the basicity ratio to 1.2 and 0.5 weight % and graphite fines, were placed in the crucible without any scrap metal normally used in electric furnace steelmaking. After the crucible was placed in the furnace, the furnace was activated to create a plasma (approximately 6–8 cm long) between the graphite electrodes. Due to the very high temperatures, the metallized pellets were completely melted within 10–15 minutes. Additional pellets were individually dropped into the melt through an upper observation opening in the furnace. The pellets and crucible were weighed before and after melting.

After cooling, slag was separated from the steel with a hammer and chisel and the amounts of slag and iron recovered were determined. The amunt of iron recovered was close to 100%. Chemical analysis of the steel indicated that a major portion of the sulfur was removed with the slag. The sulfur content in the steel ranged from 0.028 to 0.048% which is below the AISI carbon steel limit of 0.05%. The carbon content 0.48 to 1.25%. This can be conveniently adjusted as required for any particular type steel by adjusting the carbon content in the starting mixture or by combusting the excess carbon in the hot metal with an oxygen lance as is common practice in various steelmaking processes.

EXAMPLE 7

Pilot plant tests were performed in a refractory-lined rotary kiln, 30 ft (9.15 m) long and having an internal diameter of 15 in (38 cm). The kiln was heated by an oil-fired burner located at the lower or discharge end and rotated at 1.32-2 rpm. The operating temperature of the hot or reaction zone was maintained between 2400 and 2480° F. (1316° and 1360° C.). Pellets of iron ore concentrate prepared in the manner described in Example 1 were used. The compositions of the iron concentrate and the hardened pellets are set forth in Table VII. The tests were made with and without feeding external coal into the kiln along with the pellets.

The pellets were fed into the kiln at the rate of 113 to 250 lb/hr (51 to 114 kg/hr). The total residence time of the pellets from the inlet to the discharge of the kiln was approximately 45–50 minutes and only 7 minutes in the hot or reaction zone. The metallized pellets were discharged from the kiln into a water quench tank for rapid cooling.

The stack gases were continually monitored during the test with automatic gas analyzers for carbon dioxide, carbon monoxide and oxygen content. The carbon monoxide content varied between 0 and 2% and the oxygen content remained close to 0%, indicating that most of the carbon monoxide content was consumed in the furnace.

With a pallet feed rate of 250 lbs/hr (114 kg/hr), the degree of pellet metallization ranged from 92 to 97.2%, the degree of metallization being the same with or without external coal. Representative chemical and physical characteristics of metallized pellets produced during this test are set forth in Table VII.

TABLE VII

COMPOSITION OF IRON ORE CONCENTRATE AND CHEMICAL ANALYSIS AND PHYSICAL PROPERTIES OF HARDENED AND METALLIZED PELLETS PRODUCED THEREFROM - EXAMPLE

| Chemical Analysis | Iron Ore Concentrate Weight % | Hardened Pellet Weight % | Metallized Pellets Weight % |
|---|---|---|---|
| Total Fe | 63.00 | 44.90 | 69.40 |
| Fe++ | — | 8.12 | 4.18 |
| Fe° | — | — | 64.40 |
| CaO | 1.12 | 6.57 | 9.86 |
| MgO | 2.74 | 1.67 | 2.83 |
| SiO$_2$ | 4.70 | 7.00 | 10.90 |
| Al$_2$O$_3$ | 0.43 | 1.06 | 1.80 |
| P | 0.04 | 0.038 | 0.043 |
| S | 0.29 | 0.29 | 0.35 |
| C | — | 14.01 | 1.77 |
| Basicity Ratio | — | 1.03 | 1.00 |
| Physical Properties | | | |
| Metallization, % | — | — | 92.8 |

TABLE VII-continued

COMPOSITION OF IRON ORE CONCENTRATE AND CHEMICAL ANALYSIS AND PHYSICAL PROPERTIES OF HARDENED AND METALLIZED PELLETS PRODUCED THEREFROM - EXAMPLE

| Chemical Analysis | Iron Ore Concentrate Weight % | Hardened Pellet Weight % | Metallized Pellets Weight % |
|---|---|---|---|
| Diameter, mm | — | 15 | 8–11 |
| Compressive strength, lbs. | — | 176 (80 kp) | 190 (86 kp) |
| Bulk density, lb/ft³ | — | — | 127(2.03t/m³) |

From these results, it can be seen that dense, highly metallized pellets having sufficient strength for handling, transportation and use in an electric steelmaking furnace operation can be produced in reduction times, at the hot zone, as short as 7 minutes with an attendant reduction in operating costs.

From the foregoing description, one skilled in the art can easily ascertain the essential characteristics of the invention and, without departing from the spirit and scope thereof, can make various changes and modifications to adapt the invention to various uses and conditions.

I claim:

1. A process for producing hardened, discrete pellets containing a substantial proportion of metallic iron from a finely-divided, iron oxide-containing material comprising the steps of:
   (a) preparing a moistened starting mixture including the iron oxide-containing material, a finely-divided carbonaceous material in an amount at least sufficient to reduce all the iron oxide to metallic iron, about 1 to about 30 weight % of a finely-divided bonding agent selected from a group consisting of the oxides, hydroxides and carbonates of calcium and magnesium, and mixtures thereof, and 0 up to about 3 weight % of a finely-divided siliceous material, as available $SiO_2$ capable of reacting with said bonding agent to form silicate or hydrosilicate bonds therewith, with a total available $SiO_2$ in said mixture being at least 0.5 weight percent; the weight percentages being based upon the total weight of the dry solids in said mixture;
   (b) forming discrete, green pellets from said starting mixture;
   (c) drying said green pellets to a moisture content of about 5% or less;
   (d) hydrothermally hardening said green pellets by contacting them with steam at a temperature of about 100 to about 250° C. for a time period sufficient for said bonding agent to from silicate or hydrosilicate bonds with the available $SiO_2$ and produce hardened and integrally bonded masses;
   (e) introducing said hardened pellets, without substantially modifying their composition, into a reduction furnace adapted to tumble said pellets; and
   (f) metallizing said hardened pellets by continuously tumbling them in the reduction furnace, at a reduction temperature of about 1033° C. up to the melting point of the metallized pellets and while maintaining the overall atmosphere inside the furnace substantially non-oxidizing, for a time period sufficient to reduce a substantial portion of the iron oxide in said pellets to metallic iron.

2. A process according to claim 1 wherein the reduction furnace is an elongated rotary kiln having a heating zone into which said hardened pellets are introduced and a reduction zone which is maintained at said reducing temperature.

3. A process according to claim 2 wherein said reduction zone is maintained at a temperature of about 1260° to about 1371° C.

4. A process according to claim 2 wherein an external carbonaceous material is introduced into the kiln heating zone along with said hardened pellets and the kiln is operated under substantially non-oxidizing conditions to prevent appreciable combustion of said external carbonaceous material.

5. A process according to claim 1 wherein the maximum reduction temperature is about 1427° C.

6. A process according to claim 2 including the step of:
   introducing a charring coal along with said hardened pellets into the kiln, said coal being charred in the kiln during metallization of said hardened pellets.

7. A process according to claim 6 including the additional steps of:
   (g) discharging a mixture of metallized pellets and coal char from the kiln;
   (h) cooling the mixture of metallized pellets and coal char in a non-oxidizing atmosphere;
   (i) separating said coal char from said metallized pellets;
   (j) comminuting said coal char; and
   (k) recycling said comminuted coal char for use as said carbonaceous material in said starting mixture.

8. A process according to claim 1 wherein said starting mixture contains an amount of said carbonaceous material in excess of that required to reduce all the iron oxide to metallic iron.

9. A process according to claim 8 wherein said starting mixture contains a sufficient amount of said carbonaceous material to make the total fixed carbon content of said starting mixture up to about 20 weight %, based on the total weight of the dry solids.

10. A process according to claim 1 wherein said bonding agent is burned or hydrated lime and the weight ratio of the lime, calculated as CaO, to the total weight of the siliceous material, calculated as $SiO_2$, is about 0.5:1 to about 5:1.

11. A process according to claim 1 wherein said bonding agent is calcium oxide or calcium hydroxide and about 2 to about 10 weight % thereof is included in said starting mixture.

12. A process for producing hardened, discrete pellets containing a major proportion of metallic iron from a finely-divided iron ore concentrate comprising the steps of:
   (a) preparing a moistened starting mixture containing a finely-divided iron ore concentrate, a finely-divided carbonaceous material in an amount at least sufficient to reduce all the iron oxide to metallic iron, about 1 to about 30 weight % of a finely-divided bonding agent selected from the group consisting of the oxides, hydroxides and carbonates of calcium and magnesium, and mixtures thereof, and 0 up to about 3 weight % of a finely-divided siliceous material, as available $SiO_2$ capable of reacting with said bonding agent to form silicate or hydrosilicate bonds therewith, with a total available $SiO_2$ in said mixture being at least 0.5 weight percent; the weight percentages being base upon the total weight of the dry solids in said mixture;

(b) forming discrete, green pellets from said starting mixture;

(c) drying said green pellets to a moisture content of about 5% or less;

(d) hydrothermally hardening said green pellets by contacting them with steam at a temperature of about 100 to about 250° C. for a time period sufficient for said bonding agent to form silicate or hydrosilicate bonds with the available $SiO_2$ and produce hardened and integrally bonded masses;

(e) providing an elongate rotary kiln including a heating zone and a reduction zone;

(f) maintaining the kiln reduction zone at a reduction temperature of about 1033° C. up to the melting point of said pellets after metallization;

(g) introducing said hardened pellets, without substantially modifying their composition, into the kiln heating zone;

(h) advancing said pellets from the kiln heating zone to the kiln reduction zone while tumbling; and (i) tumbling said pellets in the kiln reduction zone at said reducing temperature and while maintaining the overall atmosphere inside the kiln substantially non-oxidizing for a time period sufficient to reduce a substantial portion of the iron oxide to metallic iron.

13. A process according to claim 12 wherein the kiln reduction zone is maintained at a reducing temperature of about 1260° to about 1371° C.

14. A process according to claim 12 including the step of:

(j) introducing an external carbonaceous material into the kiln heating zone along with said hardened pellets during step (g) and operating the kiln at conditions which prevent appreciable combustion of said external carbonaceous material.

15. A process according to claim 12 including the steps of:

(k) introducing a charring coal into the kiln heating zone along with said hardened pellets during step (g), said coal being tumbled with said pellets during metallization;

(l) operating the kiln at conditions which prevent appreciable combustion of said charred coal but provides charring thereof;

(m) discharging a mixture of metallized pellets and coal char from the kiln;

(n) cooling the mixture of metallized pellets and coal char in a non-oxidizing atmosphere;

(o) separating said coal char from said metallized pellets;

(p) comminuting said coal char; and (q) recycling said comminuted coal char for use as said carbonaceous material in said starting mixture.

16. A process according to claim 12 wherein said starting mixture contains a sufficient amount of said carbonaceous material to make the total fixed carbon content of said starting mixture up to about 20 weight %, based on the total weight of the dry solids.

17. A process according to claim 12 wherein said bonding agent is burned or hydrated lime and said starting mixture contains a sufficient amount of lime to provide said metallized pellets with a basicity ratio of about 1.5 to about 4.

18. A process according to claim 12 wherein said bonding agent is calcium oxide or calcium hydroxide and said starting mixture contains about 2 to about 10 weight % thereof.

19. A process according to claim 12 wherein said starting mixture contains about 1 to about 3 weight % silica.

20. A process for producing hardened, discrete pellets containing a substantial proportion of metallic iron from a finely-divided, iron oxide-containing material comprising the steps of:

(a) preparing a moistened mixture including the iron oxide-containing material, a finely-divided carbonaceous material in an amount at least sufficient to reduce all the iron oxide to metallic iron, a finely divided siliceous material as part of said iron oxide-containing material or as separate ingredient, and a bonding agent consisting of the oxides and carbonates of calcium and magnesium and mixtures thereof;

(b) forming discrete, green pellets from said mixture;

(c) hardening said green pellets under conditions whereby substantially all the fixed carbon in said carbonaceous material remains available and said bonding agent reacts with available $SiO_2$ in said siliceous material to form silicate or hydrosilicate bonds for producing hardened pellets having sufficient strength to withstand a tumbling environment;

(d) introducing said hardened pellets, without substantially modifying their composition, into a reduction furnace adapted to tumble said pellets; and (e) metallizing said hardened pellets by tumbling them in the reduction furnace, at a reduction temperature of about 1033° C. up to the melting point of the metallized pellets and while maintaining the overall atmosphere inside the furnace substantially nonoxidizing, for a time period sufficient to reduce a substantial portion of the iron oxide in said pellets to metallic iron.

21. A process according to claim 20 wherein the reduction furnace is an elongated, rotary kiln having a heating zone into which said hardened pellets are introduced and a reduction zone which is maintained at said reducing temperature.

22. A process according to claim 21 wherein said reduction zone is maintained at a temperature of about 1260° C. to about 1371° C.

23. A process according to claim 20 wherein said mixtures includes about 1 to about 30 weight % of said bonding agent and up to about 3 weight % of said siliceous material, the weight percentages being based on the total weight of the dry solids in said mixture.

24. A process according to claim 23 wherein said green pellets are hardened hydrothermally by contacting them with steam at a temperature of about 100° C. to about 220° C. for a time period sufficient for form hardened and integrally bonded masses.

* * * * *

UNITED STATES PATENT AND TRADEMARK OFFICE
CERTIFICATE OF CORRECTION

PATENT NO. : 4,239,530
DATED : December 16, 1980
INVENTOR(S) : Mehmet A. Goksel

It is certified that error appears in the above-identified patent and that said Letters Patent are hereby corrected as shown below:

Column 19, lines 60-63 through Column 20, lines 1-2 should read as follows:

--17. A process according to claim 12 wherein said bonding agent is burned or hydrated lime and the weight ratio of the lime, calculated as CaO, to the total weight of the siliceous material, calculated as $SiO_2$ is about 0.5:1 to about 5:1.

Column 20, line 53 "mixtures" should be --mixture--.

Signed and Sealed this

*Thirty-first* Day of *March 1981*

[SEAL]

*Attest:*

RENE D. TEGTMEYER

*Attesting Officer*  *Acting Commissioner of Patents and Trademarks*